United States Patent
Moore et al.

[15] 3,678,933
[45] July 25, 1972

[54] SURGICAL SPONGE OR BANDAGE

[72] Inventors: Francis C. Moore; Leon A. Perkinson, both of Indianapolis, Ind.

[73] Assignee: Moore-Perk Corporation, Indianapolis, Ind.

[22] Filed: July 17, 1970

[21] Appl. No.: 55,842

[52] U.S. Cl. ................................. 128/296, 128/156, 161/160
[51] Int. Cl. ........................................................ A61f 13/00
[58] Field of Search ................. 128/156, 284, 287, 290, 296; 161/50-51, 112, 160-161

[56] References Cited

UNITED STATES PATENTS

| | | |
|---|---|---|
| 2,923,298 | 2/1960 | Dockstader et al. ................. 128/296 |
| 3,221,738 | 12/1965 | Ekberg et al. ........................ 128/287 |
| 3,344,789 | 10/1967 | Arnold et al. ........................ 128/287 |
| 3,446,208 | 5/1969 | Fukuda ................................. 128/296 |
| 3,485,705 | 12/1969 | Harmon ............................ 128/290 R |
| 3,528,417 | 9/1970 | Gardner et al. ...................... 128/156 |
| 3,331,728 | 7/1967 | Lane ..................................... 128/296 |

*Primary Examiner*—Charles F. Rosenbaum
*Attorney*—Dawson, Tilton, Fallon & Lungmus

[57] ABSTRACT

Layers of thin thermoplastic film are brought into contact with opposite surfaces of superposed layers of absorbent material, such as sheets of fibrous crepe paper of facial quality, rayon fibers, or flexible polyurethane foam. The layers of plastic film are covered with a loosely-woven cotton scrim or gauze (or with spun-bonded nylon). Additional layers of the thin plastic film may then cover the exterior surfaces of the scrim layers. The multi-layer article thus formed is then compressed and heated to melt the plastic films. The melted plastic bonds the scrim to the paper, separating as it melts to communicate the absorbent paper core with the exterior of the pad and to gather itself about the threads of the scrim in wrapping, covering engagement. The resultant pad is highly absorbent upon contact with a liquid, yet the absorbed liquid will not "bleed" back from the pad thus making it highly desirable as a surgical sponge or bandage.

12 Claims, 5 Drawing Figures

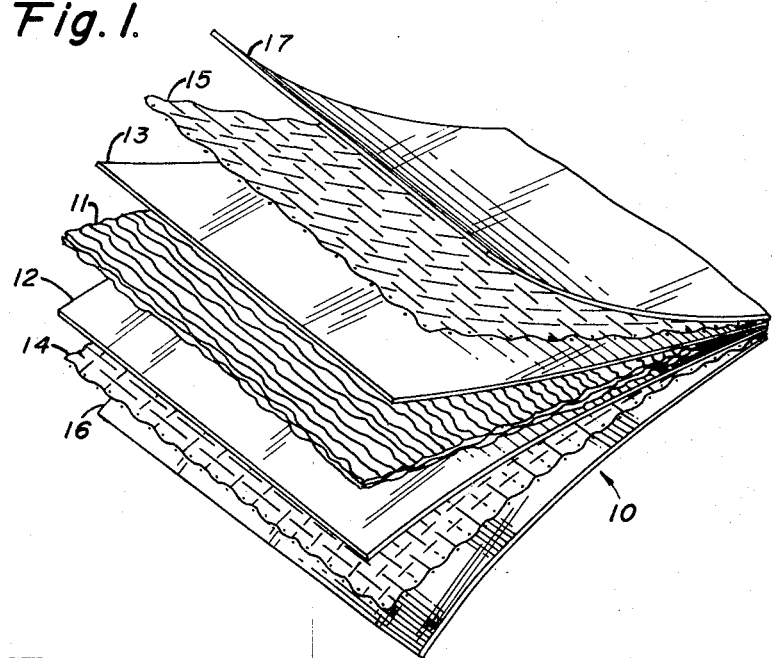
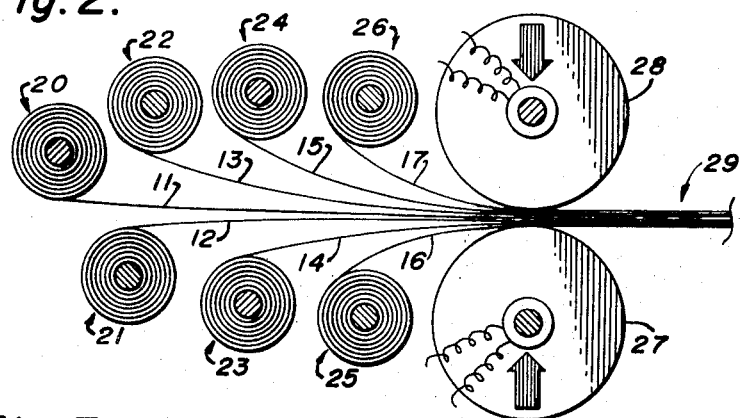
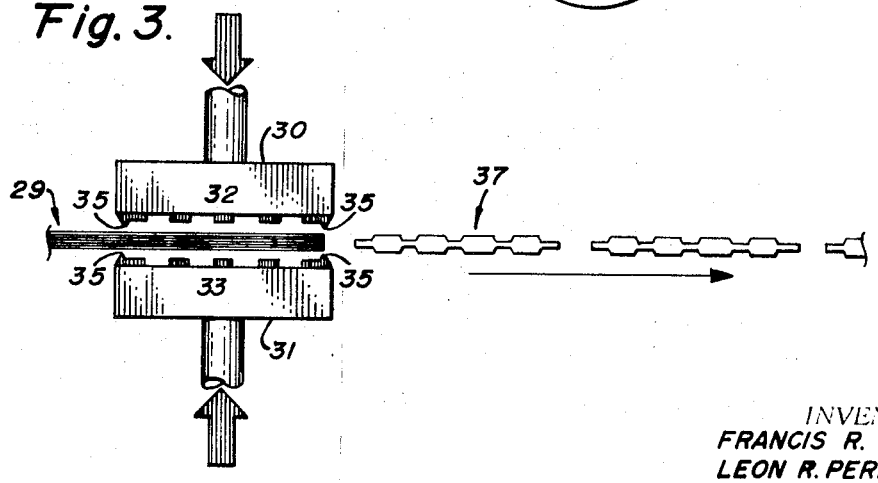

Patented July 25, 1972

VARIATION

INVENTORS
FRANCIS R. MOORE
LEON R. PERKINSON

By Dawson Tilton Fallon and Lungmus
ATT'YS.

SURGICAL SPONGE OR BANDAGE

DETAILED DESCRIPTION

The present invention relates to a highly absorbent surgical sponge or bandage which is useful in absorbing fluid in surgical operations or in dressing wounds. The absorbent dressing of the present invention has a nonsticking, yet non-sliding surface so that it is particularly advantageous in the dressing of burn wounds. It has the characteristic of a high rate of absorption even though presenting a plastic-coated surface for wound contact; and the absorbed fluid will not "bleed" (i.e. seep) back into the wound.

Extensive effort has been devoted to the development of a surgical dressing which has the qualities of a nonsticking surface yet which does not slide when applied to a wound, and which is highly absorbent, has a fast absorption rate, provides good padding quality, has mechanical strength, and is easily sterilized. Further, such a bandage should contain no toxic material, and it should not bleed back into the wound those fluids which have been absorbed. The article is also preferably manufactured at low cost because fairly large amounts of it may be used at one time, particularly when it is used as a surgical sponge.

It will be appreciated that it is desirable for a surgical sponge to be both highly absorbent (that is, to have the capacity to absorb fairly large quanities of liquid) and to have a fast rate of absorption (that is, to absorb fluid to its capacity in a short time).

One of the most common types of wound dressings is a gauze bandage which is comprised of a number of superposed layers of cotton gauze formed by longitudinally folding a continuous web of the gauze. In one embodiment wherein the gauze is a two-ply construction, the edges are folded to the center of the bandage in an effort to eliminate frayed edges which cause loose filaments. However, this does not eliminate lint or loose edges when the web is trimmed or cut to a predetermined length. Gauze is unsatisfactory as dressing for an open wound secreting fluid because it sticks to the wound when dried. Further, this type of bandage is totally unsuitable as a surgical sponge because of the possibility of loose threads and because of its low capacity for absorption.

One known surgical dressing employs a plastic film with an array of apertures formed in it; and an absorbent material such as loosely woven cotton gauze is adhesively secured to the back of the film. This type of dressing has disadvantages as either a dressing or a sponge. If the apertures in the plastic film are too small, the absorption rate is low; and it therefore does not make a good sponge. At the same time, because of the large exterior surface provided by the plastic film, when used as a dressing, it has a slick surface and therefore causes the dressing to slide when applied to a wound secreting fluid. If, on the other hand, the apertures in the plastic film are made too large, then the absorbent material will adhere to the wound.

Polyethylene fabrics have been used as surgical sponges; however, they have been found to permit serious exudation back into the wound. Further, polyethylene fabric has a relatively high cost which renders it unattractive for applications, such as the present, which may require large amounts of the material during a single operation or, when used as a dressing for a wound, may be changed quite frequently.

It is highly undesirable to use any type of loosely woven cotton fibrous material in direct contact with an open wound when the material may contain lint or loose pieces of fabric. Such lint or loose fabric is transmitted into the wound and it becomes almost impossible to purge it from the wound.

In our co-pending, co-owned application for GAS-PERMEABLE LAMINATE AND METHOD OF FORMING THE SAME, Ser. No. 693,886, filed Jan. 22, 1969, we disclosed a gas-permeable reinforced laminate which is suitable for use as a surgical drape or the like and which includes a reinforcing layer of loosely-woven cloth, a layer of porous paper material, and an intermediate layer of plastic film for bonding the reinforcing layer to the paper. In the preferred embodiment of that application, a surgical drape is formed with a central layer of scrim material, two intermediate side layers of bonding plastic film, and exterior layers of the paper material.

Soft, highly porous cellulosic materials have a tendency to generate loose particles or lint when rubbed together abrasively. As mentioned above, such loose lint or the loose fragments of filament of a scrim are highly undesirable in a surgical dressing.

In the present invention, the core of a surgical sponge or dressing is formed of a number of layers of soft fibrous paper sheet material, preferably creped, with exterior layers of a grid material, such as a cotton scrim, or a spun bonded nylon, such as is commercially available under the mark Cerex, a product of Monsanto Co., which is calendared to a thin layer. Other core materials may be used, as explained below. Intermediate films of thermoplastic sheet material are placed between adjacent layers; and exterior layers of the same plastic film are placed over the grid material. The continuous, superposed layers, as described above, are pressed together and heated to cause the plastic material to melt and separate from itself to form apertures as defined by the filaments of the grid material. The intermediate plastic layers bond the grid material to the absorbent core material; and the plastic layers on either side of the grid material cooperate with each other and gather together about the filaments of the grid in wrapping, covering engagement.

Thus, the plastic material, in gathering itself about the grid material traps or encloses any loose threads or filaments of the grid material as well as any lint from the absorbent core. As many layers of the absorbent paper core material may be used as is desired to provide great absorbency and good padding qualities. An important characteristic of the article is its very fast rate of absorption of fluid which is a highly desirable property in a surgical sponge. Secondly, the sponge does not permit absorbed fluids to bleed or pass back into the wound. For example, if one of the pads has absorbed liquid and is then placed on a dry surface, it will leave only a very small amount of surface moisture and will not yield any significant amount of fluid under normal use conditions. Further, mechanical strength or resistance to tearing is provided by the grid material; and the plastic-coated grid, in addition to trapping lint and loose filament, provides a contact surface which will not stick to a wound when dried and yet which will not slide when applied to an open wound.

The surgical sponge or dressing of the present invention may be made of low cost material, as disclosed within, the reduce the overall cost when used either as a surgical sponge or a dressing for a wound. In addition, the surgical sponge or dressing is easily sterilized according to conventional technique and is nontoxic.

Other features and advantages of the present invention will be apparent to persons skilled in the art from the following detailed description accompanied by the attached drawing.

THE DRAWING

FIG. 1 illustrates the superposition of layers of material for constructing a preferred surgical dressing or sponge according to the present invention;

FIG. 2 is a schematic diagram of a method of making the inventive surgical dressing or sponge;

FIG. 3 is a schematic illustration of the scoring of the inventive article;

DETAILED DESCRIPTION

Figure 4:
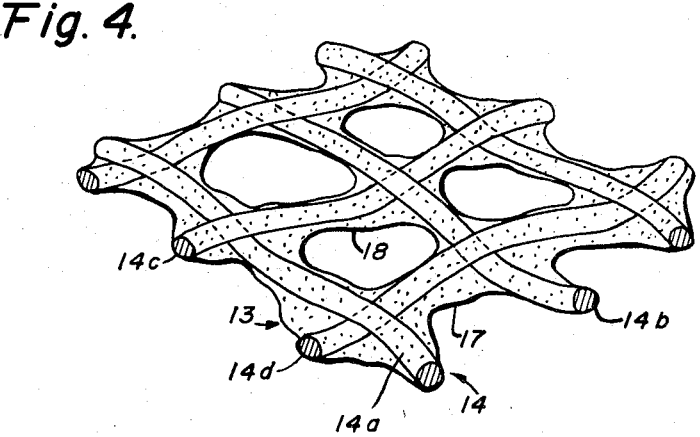
FIG. 4 is an enlarged close-up illustration of the separating of the plastic film and its wrapping engagement about the exterior grid material.

Referring now to FIG. 1 of the drawing, reference numeral 10 generally designates the superposition of sheet materials brought together for heat lamination to form a continuous web of materials bonded together and suitable for use as either a surgical sponge, a dressing for a wound, or other product requiring a highly absorbent, lint-and-filament-free material which has resistance against tearing yet provides sufficient padding that it may be used as a dressing for a wound. Further, the finished article has the characteristic of absorbing fluid at a high rate.

A central core of absorbent material is designated 11; and it may include a plurality of sheets of highly absorbent, porous, fibrous, soft paper of the quality which is used in facial tissue. Preferably, there are two superposed layers of absorbent paper forming the core 11, and the paper is slightly creped (about 100 percent is preferable) so as to provide a slightly greater amount of paper within a given unit area without decreasing the absorbency of the core material.

Other suitable highly absorbent soft materials that have been found satisfactory for use as a core material include fibrous rayon of the type that is used in place of cotton for swabbing, a highly absorbent, open-cell urethane foam such as the material available under the mark Certex.

On either side of the core padding material 11 and contiguous with it is a thin film of thermoplastic material; these plastic films are designated respectively 12 and 13. The film sheets 12 and 13 are preferably polyethylene having a thickness between 0.0001 and 0.0008 in., although thickness of up to 0.01 in. may be used. Best results have been obtained using polyethylene films having a thickness of 0.0002 in. These films are especially effective as the intermediate plastic layers 12 and 13 since one function they perform is to bond the outer grid material to the absorbent core material.

Each of the thermoplastic films 12 and 13 should be under tension as melting temperatures are approached. Preferably, the orientation should be bi-directional as would occur during normal extrusion of polyethylene films.

The effectiveness of the thermoplastic material as a bonding layer is increased if the film is surface-treated by flame or by corona discharge in the same manner as conventionally employed to make the plastic surface more receptive to inks and other decorative material. Both surfaces of each film are preferably treated in this manner; however, if only one surface is so treated, then it should be the surface which engages the grid layer.

First and second sheets of grid material designated respectively 14 and 15 in FIG. 1, are placed against the exterior surface of the plastic film layers 12 and 13. The grid material 14 and 15 may be a scrim or open network of loosely-woven, spaced fibers formed into an orthogonal array or grid. The grids are preferably spun-bonded nylon, which is highly resistant to tearing in all directions, and which is resistant to wetting when formed in single sheets.

In the case of a spun-bonded nylon grid, the apertures may be small enough so that if separate, the grid will actually hold water in amounts of a few drops. However, we have found that when backed with the thin poly film and absorbent material and treated as disclosed herein, the combination absorbs liquid at a very high rate despite the resistance to wetting of the grid; and these characteristics permit the grid to have even better resistance to passing fluid back from the absorbent material than in the case of a cotton scrim since the latter has larger apertures.

The fibers or filaments of the grid material may be natural such as cotton, hemp, flax or linen; or they may be synthetic such as nylon or polyesters. Preferably, however, the grid is a thin, soft, porous layer composed of wet resistant fibers or natural or synthetic material in closely spaced relation so that the fibers facilitate conduction of the liquid to the core material without themselves absorbing the liquid. Where the grid layer takes the form of a scrim, the filaments may be interwoven, knitted or joined together in any suitable manner. In the preferred scrim form, the grid material is formed of orthogonally-oriented sets of continuous filaments having a density of 20 filaments per inch in one direction and 15-35 filaments per inch extending in the perpendicular direction. The number of filaments per inch may, of course, vary widely with similar results.

Outer layers of thermoplastic film 16 and 17 are then placed over the grid material 14 and 15, as illustrated. The exterior plastic film layers 16 and 17 are also preferably polyethylene film having a thickness of 0.0002 in.

In FIG. 2, the absorbent material 12 is fed from a source roll designated generally by reference numeral 20. The two intermediate layers of plastic film 12 and 13 are fed respectively from source rolls generally designated 21 and 22. The grid sheets 14 and 15 are fed respectively from source rolls 23 and 24; and the exterior plastic film sheets 16 and 17 are fed respectively from source rolls 25 and 26.

The superposed layers 11–17 are brought into contact with adjacent layers substantially over their entire surface area and forced between heated calendar rolls 27 and 28 with pressure being exerted in the direction of the thick arrows to force the superposed layers of the article together while heating the same. The heating may be accomplished electrically, as schematically illustrated in FIG. 2, or by other suitable means.

The calendar rolls 27 and 28 must be heated to a point sufficient to raise the plastic polyethylene (if it is used) films 12, 13, 16 and 17 to a melting temperature which is between 250° and 400° F., the precise temperature, of course, depends upon the thickness of the plastic layers and upon the grid materials used, the speed at which the machine is operating, etc. Hence, the grid material and the core material must be dimensionally stable at these temperatures.

If the combined web is then desired to be formed into separate sheets of dressing pads or surgical sponges, the web 29 may be fed between upper and lower pressure shoes 30 and 31 each defining a set (as at 32 and 33 respectively) of cross bars adapted to supply additional pressure at preselected locations along the web 29 for scoring purposes. Further, each of the pressure platens 30 and 31 is provided with first and second transverse knife edges as at 35 for severing the web to separate it into individual sheets. Thus, issuing from the pressure platens 30 and 31 are a series of interconnected bandages or pads, each separated by a depressed score line. One such sheet of pads is designated 37 in FIG. 3.

The depressed score lines may provide lines along which individual, smaller-sized pads may be separated as by cutting without exposing loose edges of the cotton scrim. A sheet of interconnected pads may also be formed such that the absorbent material 11 is short of the score lines — that is, about each swatch of absorbent core material there is a border area which does not contain the absorbent core material.

There is another advantage in forming individual pads or sponges having a periphery or border free of the absorbent core material, namely, the border of bonded scrim material seals together the edges of the absorbent core material and forms a border having good mechanical properties, such as strength and resistance to tearing yet which is pliable and non-abrasive — qualities highly desirable for operative use of sponges. Alternatively, the steps of sealing, scoring and cutting may be performed simultaneously.

Turning now to FIG. 4, there is an illustration of the effect of heat and pressure upon the plastic films which encompasses the grid material. The grid material shown is a cotton scrim again designated 15; and only the outer layer 17 of the plastic film is shown. When suitable pressure is applied as illustrated in FIG. 2 and already discussed, the grid formed by the scrim 14 provides a number of closed boundaries beyond which the melting, separating plastic material will not withdraw from itself during deformation. That is to say, considering the individual strands 14a, 14b together with the two orthogonal strands 14c and 14d, they define a closed rectangular area; and when pressed into close contact with the plastic film, the scrim acts as a closed boundary to prevent the melting plastic film 17 from further separating from itself as at 18. The melting plastic film forms an aperture within most of the closed boundaries in the grid and gathers itself together in wrapping, covering engagement about adjoining individual filaments of the grid thus completely encompassing the scrim material in a plastic coating while advantageously collecting or gathering together all loose filaments from the scrim as well as any lint on the outer surface of the absorbent paper material. The intermediate plastic layer 13 further bonds the scrim 14 to the absorbent paper core 11; whereas the outer plastic film material 17 joins with the intermediate layer 13 to completely encompass the surface of the scrim 14 thereby providing a non-sticking (yet non-sliding) surface when applied to a wound while permitting the rapid absorption of fluid by the paper core.

It will also be appreciated that the separating plastic material provides a communication to the absorbent paper core to promote the overall absorption properties of the pad; but it has been found that not all of the areas of plastic enclosed by an individual grid need be separated or opened in order to achieve the rapid absorption characteristic described. Rather, substantial numbers of contiguous elemental areas may remain impermeable to fluid without appreciably diminishing the absorption rate. That is, the application of heat should be such as to result in a rupture of separating of the thermoplastic film within the boundaries defined by the grid material for a major portion of such zones in order to effect a greater transmission of fluid to the absorbent material; however, it is not essential that the plastic material separate at each rectangular boundary defined by the grid material.

In the case in which the grid material is spun-bonded nylon and the absorbent core is paper wadding, the absorption rate is still very high because the core is pressed into close contact with the under side of the grid material and the thermoplastic film separates within the closed boundaries of the spun-bonded nylon.

A surgical sponge thus formed has been found to provide a very rapid absorption characteristic together with a high capacity for absorbing liquid. The finished product has a soft feel to it, provides greater padding than cotton, has greater absorption capabilities than gauze, and is highly resistant to passing back the absorbed fluids.

Figure 5:
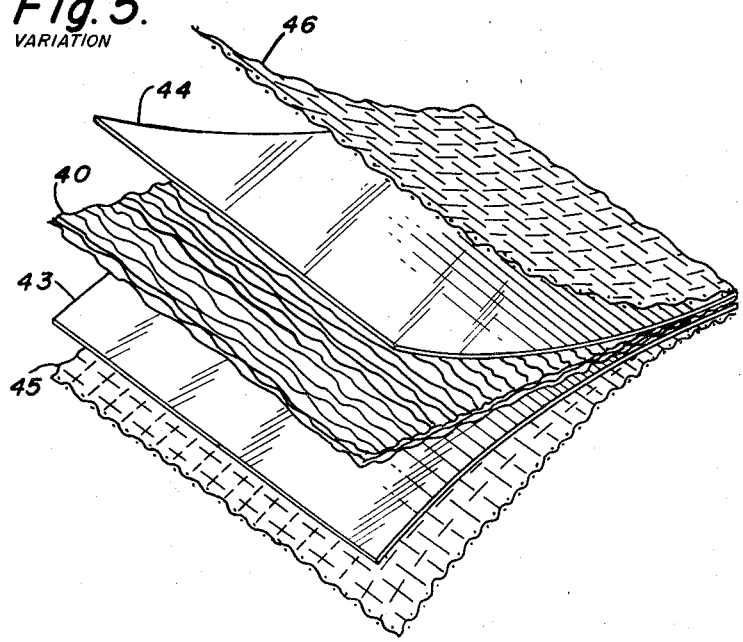
FIG. 5 illustrates the superposition of layers of material to form an alternative embodiment of the inventive article.

A variation of the arrangement of superposed layers of material for forming a surgical sponge or wound dressing according to the present invention is illustrated in FIG. 5 where again, there is a central core of highly absorbent material designated by reference numeral 40 which may be similar to the paper material 11 of the embodiment of FIG. 1. Intermediate layers of plastic film are designated by reference numeral 43 and 44; and exterior layers of the grid material (in this case cotton scrim) are designated 45 and 46. Thus, the embodiment illustrated in FIG. 5 does not have the exterior layers of plastic film. Nevertheless, the intermediate plastic layers 43 and 44 bond the grid material to the absorbent core; and at the same time, they gather and tie down any lint from the surface of the core material and prevent the formation of loose filaments of the exterior grid sheets.

The capacity of the sponge to absorb liquid may be controlled by the number of sheets or crepe paper comprising the core. For example, if it is desired to use four sheets of absorbent paper material, they may be arranged in groups of two with the non-creped surfaces of adjacent layers in contact. Preferably, in this case, the groups are themselves separated by a sandwich including a central layer of scrim material and intermediate layers of polyethylene. All three scrims may extend beyond the paper to be bonded together to form the border; and it will be appreciated that this same method may be used to build up a core of any desired capacity or thickness.

Persons skilled in the art will be able to employ other modifications of the inventive principle and substitute materials equivalent to those which have been illustrated; and it is, therefore, intended that all such modifications and substitutions be covered as they are embraced within the spirit and scope of the invention.

We claim:

1. An article suitable for use as a surgical sponge or bandage and the like, comprising: a central core of soft, flexible absorbent material, first and second exterior layers of flexible, tear-resistant grid material providing a plurality of closed boundaries each defining an aperture and covering said core material, and first and second layers of thermoplastic film material interposed respectively between said core material and said first and second layers of grid material and heat sealed therebetween to bond said materials into a unitary article with said intermediate film separated from itself within the closed boundaries defined by said grid material, said article characterized in being substantially free of lint and loose threads, in providing a nonsticking surface when applied to open wounds, and in quickly absorbing liquid with which it is brought into contact.

2. The article of claim 1 further comprising third and fourth layers of thermoplastic film material covering respectively the outer surfaces of said first and second layers of flexible grid material and heat sealed against the same to cover the exposed surface of said grid material and unite with the intermediate layers of thermoplastic film in gathering loose thread and lint attached to said article.

3. The article of claim 1 wherein said central core material is soft fibrous crepe paper of facial quality.

4. The article of claim 2 wherein said four layers of thermoplastic material are polyethylene film having a thickness between 0.0001 in. to 0.01 in.

5. The article of claim 1 wherein said grid material is a scrim formed of loosely-woven intersecting cotton fibers extending in orthogonal directions to provide said closed boundaries.

6. The article of claim 4 wherein the thickness of said polyethylene film is 0.0002 in.

7. The article of claim 6 wherein said plastic film is corona-discharge treated to provide a better bonding between said grid material and said core material.

8. The article of claim 6 wherein said plastic film is flame treated to provide a better bonding between said grid material and said core material.

9. The article of claim 1 wherein said core material is shorter than said other layers to provide a peripheral border of said grid material bonded directly together by means of said plastic material to provide a plastic-coated peripheral edge of said core material thereby preventing the escape of lint therefrom.

10. The article of claim 1 wherein said grid material is spun-bonded nylon.

11. The article of claim 1 wherein said core material is a soft, flexible, highly-absorbent, open-cell polyurethane foam.

12. In a surgical sponge or dressing, the combination comprising at least first and second contiguous layers of soft fibrous, highly-absorbent paper providing a core layer; first and second layers of tear-resistant grid sheet material comprising a plurality of filaments interconnected in spaced locations covering respectively the exposed surfaces of said core material and providing a plurality of closed boundaries each defining an aperture, said grid material extending beyond the periphery of said core material; first and second layers of polyethylene interposed respectively between said core material and said first and second grid layers and heat-sealed therebetween to bond said grid layers to said core material and to each other beyond the perimeter of said core material; and third and fourth layers of polyethylene covering respectively the outer surfaces of said grid layers, all of said polyethylene film layers being heated and pressed against said scrim layers to rupture within most of the closed boundaries defined thereby, said plastic films separating from itself at the point of rupture and encompassing the grid filaments in wrapping engagement.

* * * * *